US010316743B2

(12) United States Patent
Blanco Palacios et al.

(10) Patent No.: US 10,316,743 B2
(45) Date of Patent: Jun. 11, 2019

(54) ADVANCED ALTERNATING PISTON ROTARY ENGINE

(71) Applicants: Alberto Fausto Blanco Palacios, Lima (PE); Jose Fernando Blanco Palacios, Lima (PE)

(72) Inventors: Alberto Fausto Blanco Palacios, Lima (PE); Jose Fernando Blanco Palacios, Lima (PE)

( * ) Notice: Subject to any disclaimer, the term of this patent is extended or adjusted under 35 U.S.C. 154(b) by 964 days.

(21) Appl. No.: 14/888,125

(22) PCT Filed: May 7, 2013

(86) PCT No.: PCT/US2013/040002
§ 371 (c)(1),
(2) Date: Oct. 30, 2015

(87) PCT Pub. No.: WO2013/169817
PCT Pub. Date: Nov. 14, 2013

(65) Prior Publication Data

US 2016/0053677 A1 Feb. 25, 2016

(51) Int. Cl.
*F01C 1/073* (2006.01)
*F02B 53/02* (2006.01)
(Continued)

(52) U.S. Cl.
CPC .............. *F02B 53/02* (2013.01); *F01C 1/073* (2013.01); *F01C 1/077* (2013.01); *F02B 53/10* (2013.01);
(Continued)

(58) Field of Classification Search
CPC .......... F02B 53/02; F02B 53/12; F02B 53/10; F01C 1/077; F01C 1/073; F01C 21/10; Y02T 10/17
(Continued)

(56) References Cited

U.S. PATENT DOCUMENTS 2,071,528 A * 2/1937 Hover ........................ F01C 1/07 123/206
2,804,059 A * 8/1957 Honjyo ................... F01C 1/077 123/245

(Continued)

FOREIGN PATENT DOCUMENTS

JP 59-173523 A 10/1984

OTHER PUBLICATIONS

Office Action dated Aug. 19, 2016 for Japanese Application No. 2016-512888.
Espacenet English abstract of JP 59-173523 A.

*Primary Examiner* — J. Todd Newton
(74) *Attorney, Agent, or Firm* — Ladas & Parry LLP

(57) ABSTRACT

A rotary internal combustion engine, comprising at least one first and second piston, hub and side-disk assembly set each of the piston, hub and side-disk assembly sets having first and second pistons that are fixed on a side disk diametrically opposite each other, the hubs cooperating with each other so that the first and second pistons, hub and side disk of the first piston, hub and side-disk assembly can also rotate relative to the first and second pistons, hub and side disk of the second piston, hub and side-disc assembly, such that in operation one of said pistons will be a leading piston and one a trailing piston said disks being connected to the periphery of a set of two one way clutches or ratchets placed back-to-back, one being adapted to connect and disconnect with the shaft and therefore provide for fast moving/direct torque and the other being adapted to connect/disconnect with a planetary gear train's planets carrier and therefore provide a multiplied torque-to-force advancement of the trailing piston.

12 Claims, 7 Drawing Sheets

Fig. 3

(51) Int. Cl.
*F01C 1/077* (2006.01)
*F02B 53/10* (2006.01)
*F02B 53/12* (2006.01)
*F01C 21/10* (2006.01)

(52) U.S. Cl.
CPC .............. *F02B 53/12* (2013.01); *F01C 21/10* (2013.01); *Y02T 10/17* (2013.01)

(58) Field of Classification Search
USPC ........ 123/241, 245, 18 A, 18 R, 43 A, 43 R, 123/200; 418/35–36
See application file for complete search history.

(56) References Cited

U.S. PATENT DOCUMENTS 3,592,571 A * 7/1971 Drury ....................... F01C 1/07 418/36
5,199,391 A * 4/1993 Kovalenko ............. F01C 1/073 123/43 B
5,400,754 A * 3/1995 Blanco Palacios ..... F01C 1/073 123/245
5,433,179 A * 7/1995 Wittry ....................... F01C 1/07 123/202
5,727,518 A 3/1998 Blanco Palacios et al.
6,305,345 B1 * 10/2001 Bakhtine ................. F01C 1/063 123/241
7,347,676 B2 * 3/2008 Kopelowicz .............. F01C 1/07 123/241
2004/0187803 A1 * 9/2004 Regev ..................... F01C 1/077 123/18 A
2007/0125320 A1 * 6/2007 Smith ..................... F01C 9/002 123/18 R
2008/0011267 A1 * 1/2008 Sakita ....................... F01C 1/07 123/241
2008/0098982 A1 * 5/2008 Sakita ....................... F01C 1/07 123/241
2010/0251991 A1 * 10/2010 Drachko ................... F01C 1/07 123/221
2014/0109864 A1 * 4/2014 Drachko ................. F01C 1/077 123/200

* cited by examiner

ENGINE's 2D FORCE TRANSMISSION - 4 Combustion-chamber-sets

ENGINE's 3D FORCE TRANSMISSION

ENGINE COMPLETED

ADDENDA 1: Engine's Basic Relational Formulae (Part 1)

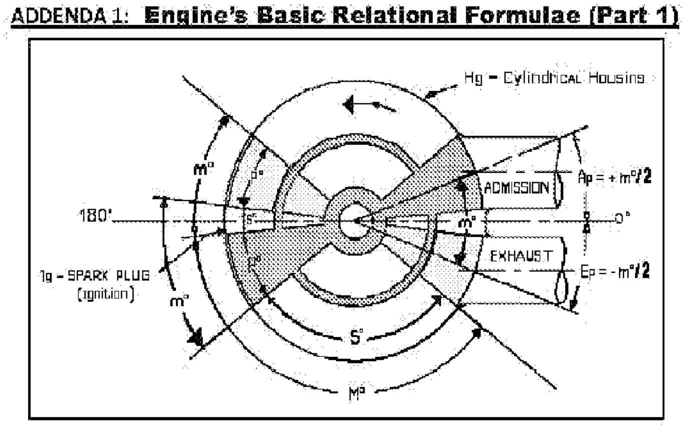

BASIC FORMULAE:

Fundamental Basic Relation: $= M^\circ + m^\circ = 180^\circ$ → Basic Generating Angle → (1)

General Basic Relation: $= M^\circ + m^\circ = 180^\circ/n$ → For More Than 1 Set (n = number of Combustion Chamber Sets)

Planetary Geared Reduction: $= \frac{M^\circ}{m^\circ} = G_R$ → 2

Compression Ratio: $\frac{S^\circ}{s^\circ} = \frac{M^\circ - p^\circ}{m^\circ - p^\circ} = C_R$ → (3)

DERIVING PISTON THICKNESS ANGLE (p°) in terms of desired Compression Ratio and Geared Reduction:

Starting with Compression Ratio formula (3) and multiplying both sides by $(m^\circ - p^\circ)$:

$$M^\circ - p^\circ = C_R\,(m^\circ - p^\circ)$$

$$M^\circ - p^\circ = C_R \cdot m^\circ - C_R \cdot p^\circ$$

Reordering terms:

$$C_R \cdot p^\circ - p^\circ = C_R \cdot m^\circ - M^\circ$$

Factorizing: $p^\circ (C_R - 1) = C_R \cdot m^\circ - M^\circ$

Dividing both sides by $(C_R - 1)$:

$$p^\circ = \frac{C_R \cdot m^\circ - M^\circ}{(C_R - 1)}$$ but from (2) → $M^\circ = G_R \cdot m^\circ$ Then: $$p^\circ = \frac{C_R \cdot m^\circ - G_R \cdot m^\circ}{(C_R - 1)} = \frac{m^\circ \cdot (C_R - G_R)}{(C_R - 1)}$$

But from 2 and 1 : $$\frac{G_R}{1} = \frac{M^\circ}{m^\circ} \rightarrow \frac{(G_R + 1)}{1} = \frac{(M^\circ + m^\circ)}{m^\circ} = \frac{(180^\circ)}{m^\circ} \rightarrow m^\circ = \frac{180^\circ}{(G_R + 1)}$$

Therefore: $$P^\circ = m^\circ \cdot \frac{(C_R - G_R)}{(C_R - 1)} = \frac{180^\circ}{(G_R + 1)} \cdot \frac{(C_R - G_R)}{(C_R - 1)}$$ FUNDAMENTAL BASIC FORMULA Therefore: $$P^\circ = \frac{180^\circ/n \cdot (C_R - G_R)}{(G_R + 1) \cdot (C_R - 1)}$$ = GENERAL BASIC FORMULA (for n sets)

(defines pistons angle for given $C_R$ and $G_R$).

FIG. 6

ADDENDA 2: Engine's Basic Relational Formulae (Part 2)

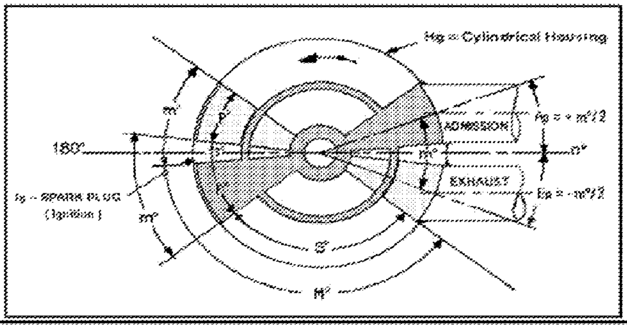

| | | | | | |
|---|---|---|---|---|---|
| 1 | $M° + m° = (180°/n)$ | 2 | $M° = (180°/n) - m°$ | 3 | $m° = (180°/n) - M°$ |
| 4 | $M°/m° = G_R/1 =$ arc M/arc m | 5 | $M° = m°. G_R$ | 6 | $m° = M° / G_R$ |
| 7 | $M°/(M°+m°) = G_R/(G_R+1)$ | 8 | $M° = (180°/n) . G_R/(G_R+1)$ | 9 | $G_R = M° / ((180°/n) - M°)$ |
| 10 | $m°/(M°+m°) = 1/(G_R+1)$ | 11 | $m° = (180°/n) / (G_R+1)$ | 12 | $G_R = ((180°/n) / m°) - 1$ |
| 13 | $M° = S° + p°$ | 14 | $m° = s° + p°$ | 15 | $G_R = (S° + p°) / (s° + p°)$ |
| 16 | $S° = M° - p°$ | 17 | $s° = m° - p°$ | 18 | $C_R = (M° - p°) / (m° - p°)$ |
| 19 | $p° = M° - S°$ | 20 | $p° = m° - s°$ | 21 | $M° - m° = S° - s°$ |
| 22 | $C_R = S° / s°$ | 23 | $S° = s°. C_R$ | 24 | $s° = S° / C_R$ |
| 25 | $C_R$ = arc S / arc s | 26 | arc S = arc s . $C_R$ | 27 | arc s = arc S / $C_R$ |
| 28 | $p° = \frac{(180°/n) . (C_R - G_R)}{(C_R - 1).(G_R + 1)}$ | 29 | $C_R = \frac{(180°/n).G_R - p°.(G_R+1)}{(180°/n) - p°.(G_R+1)}$ | 30 | $G_R = \frac{(180°/n).C_R - p°.(C_R-1)}{(180°/n) + p°.(C_R-1)}$ |
| 31 | $p° = [(180°/n) - (S° + s°)] / 2$ | 32 | $p° = \text{arc } p_o . 360° / pi . D$ | 33 | $\text{arc } p_o = p° . pi . D / 360°$ |
| 34 | $S° + s° = (180°/n) - 2p°$ | 35 | $S° = (180°/n) - 2p° - s°$ | 36 | $s° = (180°/n) - 2p° - S°$ |
| 37 | $2p° + (S° + s°) = (180°/n)$ | 38 | MPD = D - Ph | 39 | p = p° . MPD . pi / 360° |
| 40 | S = S° . MPD . pi / 360° | 41 | s = s° . MPD . pi / 360° | 42 | Pa = Pw . Ph |
| 43 | Sc=2.Pa + 2.s.Ph + 2.s.Pw | | **Pw** = Piston width | | **Ph** = Piston height |
| | $p_o$ = Pistons' Outer Arc | | $C_R$ = Compression Ratio | | $G_R$ = Gear Ratio |
| | pi = 3.14159 = PI() in Excel | | **D** = Internal Outer Dia. = $H_g$ | | $I_s <= (180°/n)+(s°/2)°$ |

14 $m° = p° + s°$ $Ap = m°/2 = p°/2 + s°/2 = -Ep$

Ap = Admission Port center angle $p_o$ = Admission Port arc = Piston's outer arc $S° = (180°/n - 2p°) . \{C_R / (C_R+1)\}$ 16 $S° = M° - p°$ 8 $M° = (180°/n) . \{G_R / (G_R+1)\}$ ∴ $S° = (180°/n) . \{G_R / (G_R+1)\} - p°$ Ep = Exhaust Port center angle $Ep = -(m°/2) = -(p°/2 + s°/2) = -Ap$ $p_o$ = Exhaust Port arc = Piston's outer arc n = number of combustion chamber sets 8 M° = Leading Piston's Expansion Angle 11 m° = Trailing Piston's. Advancement Angle 28 p° = Piston Thickness Angle (-)

16 S° = Swept Angle = M° - p°

17 s° = Compressed Angle = m° - p°

24 s° = Compressed Angle = S° / $C_R$ 39 p = Mean Pistons' Arc

40 S = Mean Admission Arc 41 s = Mean Compressed Arc

38 MPD = Mean Pistons' Dia. = Hg - Ph

43 Sc = Compressed Surface

FIG. 7

ADVANCED ALTERNATING PISTON ROTARY ENGINE

RELATED APPLICATION

This application is a national phase entry under 35 USC 371 of International Patent Application No PCT/US2013/040002 filed on 7 May 2013, the disclosures of which are incorporated in their entirety by reference herein.

REFERENCE TO RELATED APPLICATIONS

This application is a non-provisional application claiming priority from our provisional application 61/688,018 filed on May 7, 2012, the contents of which are incorporated herein by reference.

FIELD OF THE INVENTION

The present invention relates to improvements in alternating piston rotary engines.

BACKGROUND OF THE INVENTION

In our prior U.S. Pat. No. 5,400,754 we described a rotary internal combustion engine with a paddle and ratchet assembly in which each of first and second gear trains has (A) a first ratchet for rotationally connecting a respective one of the hubs to the propeller shaft in a first rotational direction and disconnecting the one of the hubs from the propeller shaft in a second, opposite relative rotational direction and (B) a second ratchet with a gear reduction for reducing rotational speed relative to the rotational connection of the first ratchet and rotationally connecting the propeller shaft to the one of the hubs in the first rotational direction with the reduced rotational speed and disconnecting the propeller shaft from the one of the hubs in the second rotational direction.

In our prior U.S. Pat. No. 5,727,518, which is a continuation-in-part of U.S. Pat. No. 5,400,754, we have described a modification of this engine in which paddles, which operate as pistons are mounted on side disks.

The contents of our two prior US patents are incorporated herein by reference.

SUMMARY OF THE PRESENT INVENTION

The present invention provides more efficient ways of utilizing the energy generated in a rotary internal combustion engine of the general type described in our prior U.S. Pat. No. 5,727,518. This efficiency derives from the ability to locate the paddles at a relatively large distance from the axis about which they rotate thereby permitting high torque even with a relatively low fuel consumption. This improved efficiency permits production of much greater torque than is possible with conventional engines of the same capacity even when operating at lower rotational speeds.

Major differences include:

1st. The use of Planetary Gear Trains, instead of Parallel Shaft Trains, to make it completely concentric. In the present invention a planetary gear train is provided for each piston carrier side disk at each axial end of the shaft.

2nd. The Basic Fundamental Formulae, as in Addenda 1 and 2, to define the geometry and placing of the elements that form a Combustion-Chamber Set, to ensure proper operation of the engine. The precise calculation of the Angular Thickness of the Pistons as given by the following Basic Formula:

$$p^o = \frac{180^\circ \cdot (C_R - G_R)}{(G_r + 1) \cdot (C_R - 1)} = \text{FUNDAMENTAL BASIC FORMULA}$$

where (po) is the required angular distance between piston faces, or the mean angular distance in case concave piston faces are used; 180° is the Basic Generating Angle; $C_R$ is the desired Compression Ratio and $G_R$ is the Geared Reduction Ratio of the Planetary Gear Train.

3rd. The Division of the Combustion Chamber Set into more than one complete set according to formulae in Addends 1 and 2, to obtain a 'short-stroke effect', to improve thermal efficiency, increase Torque, and reduce fuel consumption. In this case the formula will include (n) as the desired number of Combustion Chamber Sets which has to divide the Basic Generating Angle (180°), as follows: (see FIG. 4 where four complete sets are shown)

$$p^o = \frac{180^\circ / n \cdot (C_R - G_R)}{(G_R + 1) \cdot (C_R - 1)} = \text{GENERAL BASIC FORMULA (see Addend 1)}$$

4th. The Engine Design itself, which as different to others, allows the Optimization of a much longer Length of the Torque lever-arm (FIG. 4) directly in relation to pistons' face dimensions straight away, without the limitations of a crankshaft, to further reduce the Compressed Surface Area, and thus further improve Thermal Efficiency, substantially increase Torque and reduce fuel consumption.

5th. The Engine's Basic Operating System with its Unique Force Transmission System, using Unidirectional Rotation Transmission Devices, as defined here and in FIGS. 1, 2 and 3.

6th. An Axial External Projection, see FIGS. 2, 3 and 5, from the Planets-carrier, of first and/or second Planetary Gear Trains, to output their multiplied torque concentric to the main shaft (which can be used as the main drive shaft for its great torque.

7th. The Engine's Cooling System consisting of a Cooling Chamber at both axial ends of the surrounding internal-combustion-cycle chamber and side-disks, with Coolant Inlet and Outlet means, and Coolant Propellers on side-disks to pump coolant through side-disks and/or pistons. Optionally, it may also include an inter-connected internal combustion cooling chamber or cooling fins on the external periphery of the surrounding cycle chamber.

8th. Means on each of the hubs and/or their connecting projection, to indicate, outside the combustion chamber, the internal position of the pistons, to activate precise direct injection and/or ignition means for engine Starting Procedure and/or for Otto or Diesel Cycle Operation.

Accordingly the present invention provides a rotary internal combustion engine, comprising: engine block means for defining at least one combustion chamber whose center line is located on the circumference of a circle;

a rotatable drive shaft extending axially through said circle; at least one first and second piston, hub and side-disk assembly set each set substantially sealingly in the internal-combustion-cycle chamber and freely rotatable on the drive shaft, each of the piston, hub and side-disk assembly sets having first and second pistons that are fixed on a side disk diametrically opposite each other with a hub therebetween, the hubs cooperating with each other so that the first and second pistons, hub and side disk of the first piston, hub and side-disk assembly can also rotate relative to the first and second pistons, hub and side disk of the second piston, hub and side-disc assembly, the side disks of the first and second piston, hub and side-disk assembly respectively extending radially from the hubs said disks being connected to the periphery of a set of two one way clutches or ratchets one being adapted to connect and disconnect with the shaft and therefore provide for fast moving/direct torque and the other being adapted to connect/disconnect with a planetary gear train's planets carrier and therefore provide for multiplication of said torque through a planetary gear train;

inlet means for admitting air and/or an air/fuel mixture into the chamber depending on the type of operating cycle;

spark plug, glow plug or fuel injector for admitting fuel into the chamber, whereby to define at least one ignition point for an air/fuel explosion in the combustión chamber, and outlet means for exhausting spent gas from the chamber.

Preferably the combustión chamber is annular or where multiple sets of piston, hub and side disk assemblies are present forms a part of an annulus, the limits of said parts being determined by location of the pistons, although other shapes, such as a torus or partial torus are possible. Where multiple sets of piston, hub and disk assemblies are present, there will be one such set comprising one first and second piston, hub and side-disk assemblies for each combustion chamber so that, for example if there are four sets of one first and second piston, hub and side-disk assemblies, there will be four combustion chambers, each one forming a part of an annulus or torus.

The disks on which the pistons are mounted may themselves have center portions which are elevated with respect to the outer portion of the disk, said elevations extending outwardly from the hubs which extend outwardly to the vicinity of the pistons.

The number of combustion chambers present will depend on the intended use of the engine, from one to twenty, for example, four to eight being typical.

The pistons are typically mounted directly on the disks being mounted perpendicular to the disk surface and oriented radially with respect to the drive shaft about which the disks rotate. It is, however also possible to mount the pistons on protrusions extending from or brackets mounted on the surface of the disk as long as the pistons are correctly aligned.

Typically each of said pistons is connected to a planetary gear train in which power is transferred to the drive shaft from one of the two sets of ratchets. Typically, pistons are fixed to piston-carrying side disks, each of which is directly associated with two one-way clutches or ratchets placed back to back so that one of them will necessarily skid or disconnect every time the other connects and therefore drives the assembly. This arrangement is a substantial difference and improvement over our prior U.S. Pat. Nos. 5,400,754 and 5,727,518. A further difference is that each side disk is also directly related to a planetary gear train to concentrically multiply the torque of the trailing piston of a piston set so as to ensure that it will advance to the ignition point to initiate the next explosión in spite of the backward force (resulting from the on-going explosion) acting against its required rotation.

BRIEF DESCRIPTION OF THE DRAWINGS

FIGS. 6 and 7 (Addenda 1 and 2) depict the engine's basic relational formulae according to the present invention.

DETAILED DESCRIPTION OF THE INVENTION

Figure 1:
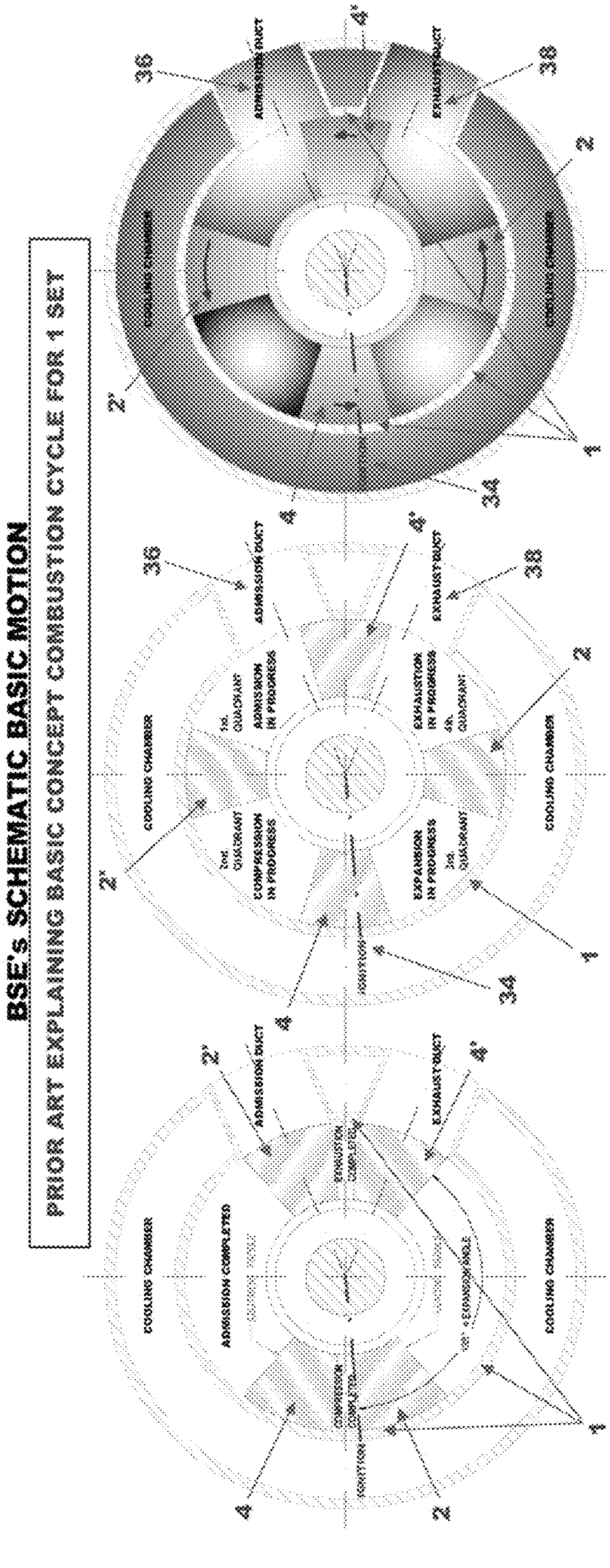
FIG. 1 depicts in schematic form the basic motion of a rotary engine according to our previous invention.
Figure 2:
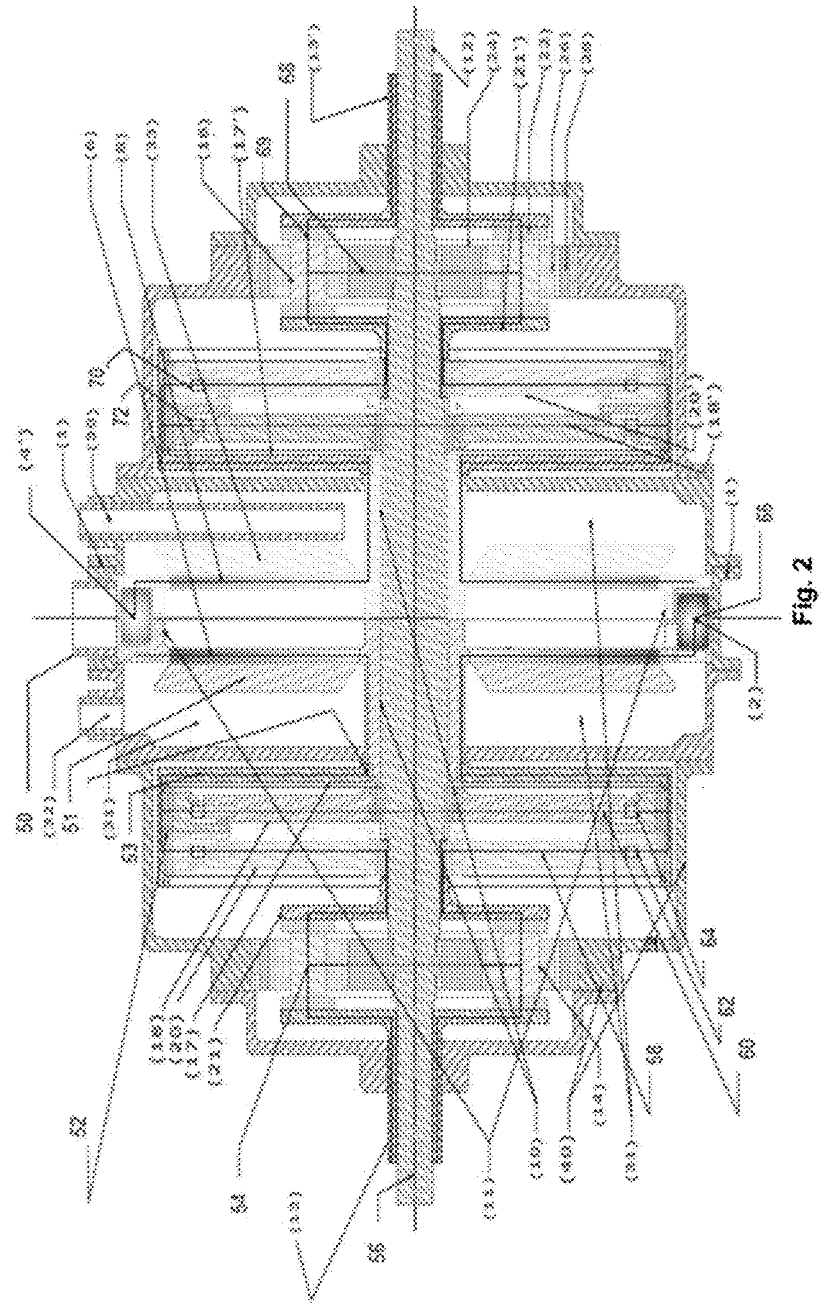
FIG. 2 depicts in two dimensions the internal transmission forces of an engine according to the present invention.
Figure 3:
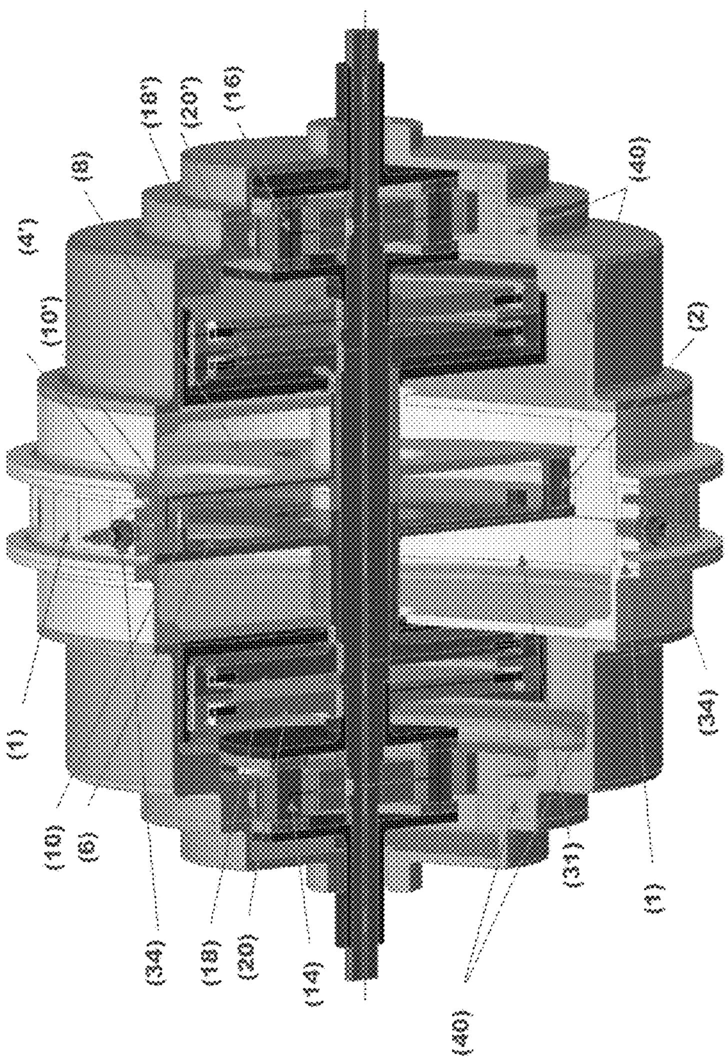
FIG. 3 depicts in three dimensions the internal transmission forces of an engine according to the present invention.
Figure 4:
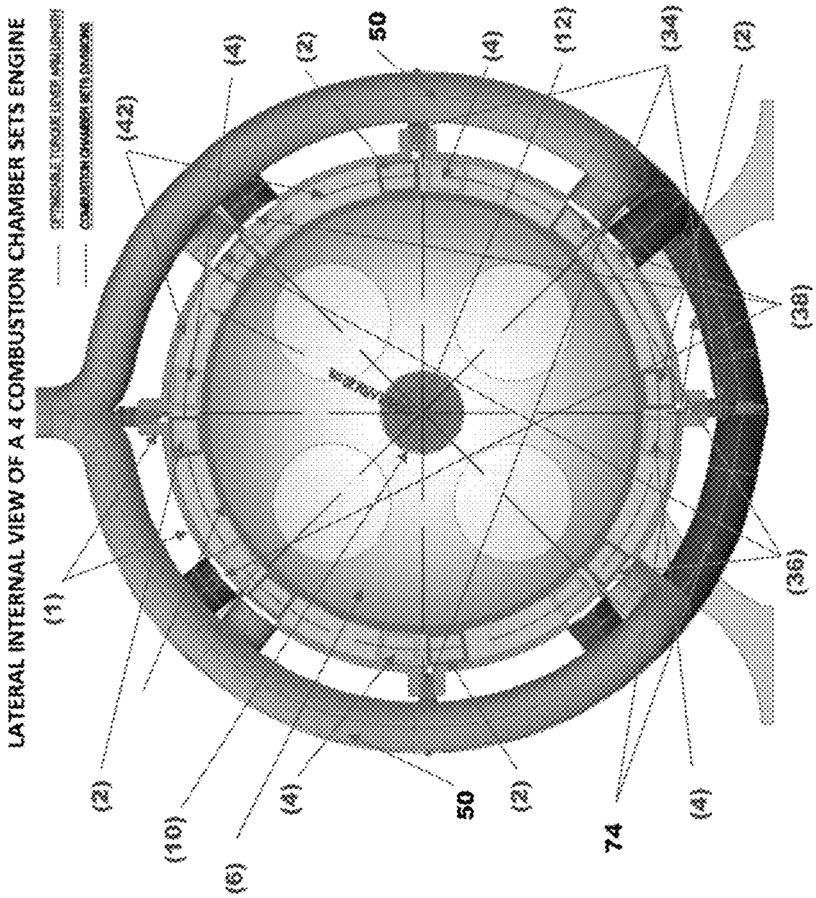
FIG. 4 depicts an engine according to the present invention having four combustion chambers.
Figure 5:
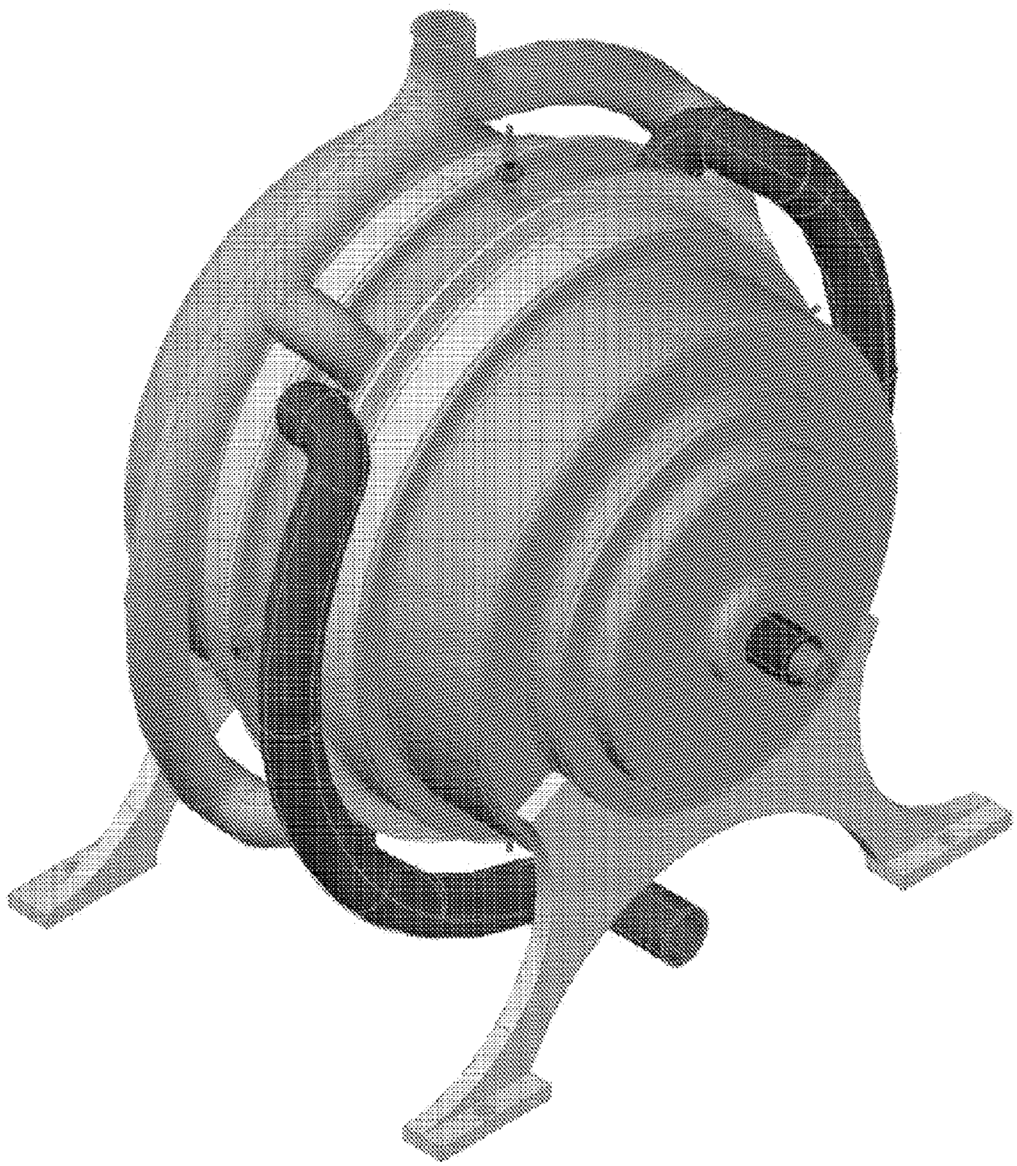
FIG. 5 depicts a completed engine according to the present invention.

A concentric rotary internal combustion engine, as in FIGS. 2, 3 and 4 basically, has a static surrounding cylindrical engine-head block (1) within which concentrically rotates mainly more than one rotational internal-combustion-cycle chamber(s) (42), each one having first and second diametrically opposite Pistons (2, 2' and 4, 4'), each one having angular arc distance between front and rear faces according to hereby derived general basic formula, all of them fixed at an optimizable radially outward lever-arm length, for a higher torque at best thermal efficiency, as in FIG. 4, on corresponding first and second Side-Disks (6, 8) interdependently rotating relative to each other, and with Hubs (central hubs 10, and radially outward hubs 11), facing one another but with pistons in an alternate position. In operation, pistons (2, 2' and 4, 4') are skidding on the opposite side-disk's radially outward hub (11), one of said pistons, performing, on explosion, as a leading piston, e.g. (2), when its rear face has been pushed forward by the explosion, while the front face of the trailing piston, e.g. (4), which is the piston following the leading piston and which is fixed onto the opposite side-disk, is being pushed backward. Both pistons will alternate performance on the next explosion.

Each of the rotational internal-combustion-cycle chamber (s) (42) is the space contained in the varying volume chamber enclosed between the faces of two consecutive pistons: the rear face of a leading piston, e.g. (2), and the front face of its trailing piston, e.g. (4), including the portion of the side-disks (6 and 8) and their radially outward hubs (11), and the portion of the engine-head block (1) in between those faces, all of which are substantially sealed between them within the static surrounding cylindrical engine-head block (1).

The rotational internal-combustion-cycle chamber (42), with its pistons and side-disks (6 and 8), are freely rotatable (not-directly-driving) on a Drive Shaft (12), with said drive shaft (12) extending axially through the center of said side-disks (6, 8).

First and second Planetary Gear Trains (14, 16) are for rotation by the respective axial end portions of the drive shaft (12). Each of the two planetary gear trains comprises: a peripheral ring gear (28) fixed to the engine housing (40), a sun gear (24) at the central part of the gear train and fixed to the drive shaft (12), and 2 or more planet gears (26) assembled onto a planets carrier (22) to rotate around the sun gear (24), in between the sun gear (24) and the ring gear (28), at a reduced speed but at an inversely multiplied torque, capable of backstopping the trailing piston and advancing it towards the next explosion. Each of the central hubs (10) of the side-disks (6, 8), extends axially outwards so as to connect the side-disk to its respective URTDs'-connector extension (17, 17') to connect both URTDs: (A) a first, inner, URTD (18, 18') Unidirectional Rotation Transmission Device, such as a one-way clutch, or a ratchet, for connecting/disconnecting its two concentric rotationally related elements) for rotationally connecting the one of the central hubs (10) to the drive shaft (12) in a first rotational direction and speed, and disconnecting the one of the central hubs (10) from the drive shaft (12) in a second, same, though apparently opposite, relative rotational direction due to speed difference; and (B) a second, outer, URTD (20, 20') (Unidirectional Rotation Transmission Device, such as a one-way clutch, or a ratchet, for connecting/disconnecting its two concentric rotationally related elements) for rotationally connecting, by means of Carrier Connector (21), the one of the central hubs (10) to the Planets-carrier (22) of the first Planetary Gear Train (14), to prevent the trailing piston(s) from backward rotation in the second apparently opposite rotational direction, and rotationally disconnecting the one of the central hubs (10) from the Planets-carrier (22) of the first Planetary Gear Train (14) in the first rotational direction; whereby, in an alternating operation, the drive shaft (12) and first and second pistons (2, and 2'), of first side-disk (6) and respective radially outward hub (11), all rotate in the first rotational direction and speed; and the Planets-carrier (22) of the second Planetary Gear Train (16), and first and second pistons (4, and 4') of second side-disk (8) and its respective radially outward hub (11), all rotate in the second apparently opposite relative rotational direction and speed. Axially opposite ends of the internal-combustion-cycle chamber (42) are respectively formed by the inner face of the side-disks; and, axial ends of the pistons are fixed to the inner face of the side-disks at peripheries of the side-disks where the pistons to project axially.

Ignition and/or Injection means (34), such as a sparkplug or a fuel injector, and an Inlet Port (36) for admission of air, or, an air/fuel mixture, and an Outlet Port (38) for exhaustion of spent gases, are on the static Cylindrical Engine-head Block (1), each of which are precisely defined, located and interrelated with each other.

The Engine's Cooling System, see FIG. 2, consists of a Cooling Chamber on the external periphery and at both axial ends of the surrounding internal-combustion-cycle chamber and side-disks, with Coolant Inlet and Outlet means (30, 32), and Coolant Propellers on Side-disks to pump coolant through Side-disks and/or pistons.

Each of the hubs has a means to indicate, outside the combustion chamber, the internal position of the pistons, to activate precise direct injection and/or ignition means for engine Starting Procedure and/or for Otto or Diesel Cycle Operation.

An Axial External Projection (13, 13') from the Planets-carrier, of first and/or second Planetary Gear Trains, to output their multiplied torque concentric to the main shaft (which can be used as a starting gear-shift to reduce gearbox costs, among other applications, such as being a prime mover of electricity generators in Hybrid Vehicles, and others).

The basic fundamental formulae, as in Addends 1 and 2, define the geometry and placing of the elements that form a Combustion-Chamber Set, to ensure proper operation of the engine. Proper engine operation is achieved when desired compression ratio is obtained at will, not by chance, when it can be exactly calculated. For this purpose, it is essential to calculate the Angular Thickness of the Pistons, which must also be equal to the opening of the Inlet and Outlet ports, all of which is vital to be defined for designing a more than one combustion chambers engine. The precise calculation of the Angular Thickness of the Pistons (p°), is given by the following Basic Formula:

$$p^{o} = \frac{180^{\circ} \cdot (CR - GR)}{(GR + 1) \cdot (CR - 1)} = \text{FUNDAMENTAL BASIC FORMULA}$$

where (p°) is the required angular distance between piston faces, or the mean angular distance in case concave piston faces are used; 180° is the Basic Generating Angle; $C_R$ is the desired Compression Ratio and $G_R$ is the Geared Reduction Ratio of the Planetary Gear Train. The rotational internal-combustion-cycle chambers (42) may be divided into n, more than one complete Sets, as in Addends 1 and 2, and in FIGS. 3 and 4, for a 'short-stroke effect', to obtain the smallest Compressed Surface Area, so as to Optimize Thermal Efficiency. To achieve this possibility for the first time ever, of having more than one combustion chambers simultaneously operating within the same engine, the formula, for the precise calculation of the required angular thickness of the pistons ($p_n$°), as a basis for defining the size and location of all other critical engine elements, such as the 'n' inlet and outlet ports, and ignition points, will include 'n' as the desired number of Combustion Chamber Sets which has to divide the Basic Generating Angle (180°), as follows:

$$p^{o} = \frac{180^{\circ}/n \cdot (CR - GR)}{(GR + 1) \cdot (CR - 1)} = \text{GENERAL BASIC FORMULA (see Addend 1)}$$

The Engine Design itself, which as different to Reciprocating Piston Engines and the Wankel Engine, allows the Optimization of a much longer Length of the Torque lever-arm (FIG. 4) directly in relation to pistons' face dimensions straight away, without the limitations of a crankshaft, to further reduce the Compressed Surface Area, and thus further improve Thermal Efficiency, substantially increase Torque and reduce fuel consumption. The Engine's Basic Operating System with its Unique Force Transmission System, using Unidirectional Rotation Transmission Devices, as defined here and in FIGS. 2 and 3, which performs as follows:

1st. Pistons (assembled onto 2 interacting Side-Disks) ARE NOT CONNECTED directly to the Drive Shaft, and therefore, the 2 Piston-Carrying Side-Disks ROTATE FREELY on the Drive Shaft.

2nd. Each Side-Disk Hub is directly connected to the peripheral parts of 2 Unidirectional Rotation Transmission Devices (URTD) placed back-to-back.

3rd. Each URTD has a central part and a peripheral part which engage/disengage to each other by means of especially designed contact elements, depending on the relative rotational speeds in between them.

4th. The central part of the 1st URTD (for advancement of the Shaft) connects/disconnects the Side-Disk of the Leading Piston to the Shaft.

5th. The central part of the 2nd URTD (for backstopping the Trailing Piston) connects/disconnects the Side-Disk of the Trailing Piston to the Planets Carrier of a Planetary Gear Train (with much greater torque) not only to prevent its backward rotation but, mainly, to force it to advance past the Ignition Point.

6th. Each Planetary Gear Train (1 by each Side-Disk) has 4 elements: 1 Sun Gear (at the central part of the ensemble), 1 Peripheral Inner Gear (called Ring Gear, surrounding the ensemble), 2 or more Planet Gears which rotate around the Sun Gear, in between the Sun Gear and the Ring Gear, and 1 Carrier, or Planet Gears' Carrier, which keeps the Planet Gears in place, and which rotates with them at a reduced speed, relative to the Sun Gear, but with a multiplied Torque.

7th. Sun Gears ARE FIXED to the Drive Shaft, one at each axial end, and thus, they rotate with it. Therefore, they are ALWAYS in fast relative rotation.

8th. The Peripheral Gears or Ring Gears are inner gears and ARE FIXED to the Housing of the engine, therefore, THEY DON'T ROTATE.

9th. Each Carrier directly connects, on one side, to the central part of the $2^{nd}$ URTD of each Side-Disk Hub, to perform as in $5^{th}$, and the other side of the Carrier directly connects to a Coaxial Output Shaft to make available its second, much more powerful output, to take advantage of its simultaneous higher Torque.

Particular features to note with respect to the force transmission diagram of FIG. 2 include the following:

1. the pistons are mounted on side disk piston carriers and are not connected directly to the shaft;
2. the piston carriers rotate freely on the shaft;
3. Each piston carrier is directly connected to the periphery of a set of two one way clutches (OWCs) placed back-to back, one being located inwardly (the inner OWC) of the other (the outer OWC);
4. the inner OWC's connect and disconnect with the shaft and therefore provide for fast moving/direct torque;
5. the outer OWC's connect/disconnect with related planetary gear train's planets carrier and therefore provide for slower moving/multiplied torque;
6. both "sun" gears are fixed to the shaft so they are always fast moving/direct torque
7. ring gears are fixed to the housing.

Typically, if the engine is intended for automobile or truck use, the pistons are mounted on the side disk piston carriers about 18-24 cm, for example about 20 cm from the drive shaft. When intended for other uses, such as power generation, the distance may be greater. The size and shape of the piston will also depend upon the intended use of the engine. If the combustion chamber is annular or forms part of an annulus, the pistons will have a rectangular face. If the combustion chamber is a torus or forms part of a torus, the piston face will be circular.

Another preferred feature of the present invention includes provision of space for cooling fluid between each pair of disks and provision of holes in the disks to permit circulation of cooling fluid such as coolant or water. The disks may also be fitted with radially shaped fins as propellers to draw coolant into the cooling space and also out of that space so that it can be recycled to an external cooling system.

In the rotary internal combustion engine of the present invention, each of the 2 planetary gear trains, located one at each axial end of the drive shaft (12) next to its respective outer URTD, comprises: a peripheral Ring Gear (28) fixed to the engine housing (40), a Sun Gear (24) at the central part of the gear train, fixed to the Drive Shaft (12), and 2 or more Planet Gears (26), assembled onto a Planets Carrier (22) which rotates around the Sun Gear (24), at a reduced speed but at an inversely multiplied torque, in between the Sun Gear (24) and the Ring Gear (28).

The rotary internal combustion engine of the present invention is one wherein multiple "operating sets" may be included, for example: four ignition points air and fuel feeds and inlet and exhaust outlets provided within each combustion chamber.

In operation, when an explosion occurs:

1. on the leading piston side the explosion pressure pushes the leading piston away from the trailing piston and drives the shaft through its inner OWC. The outer OWC skids due to the speed difference.
2. on the trailing piston side, the explosion pressure pushes the trailing piston backwards but the outer OWC connected to the high torque planets carrier forces it forward on to the firing position so that every explosion sets all four clutches by causing them to become engaged or disengaged;

With this configuration, it is possible to have a conventional Otto Cycle 4 strokes (admission, compression, expansion, exhaustion) take place all at once on each explosion though in their corresponding quadrant.

The Basic Engine's Internal Combustion 4-stroke Cycle takes place inside the internal-combustion-cycle chamber whereby the 4 interacting pistons, of first and second diametrically opposite pistons on corresponding first and second side-disks, determine 4 varying size sectors or quadrants. Admission takes place in the $1^{st}$ quadrant; Compression in the $2^{nd}$, Explosion and Expansion in the $3^{rd}$; and Exhaustion in the $4^{th}$, so that, on every explosion, all 4 strokes automatically take place simultaneously although each of them in their respective quadrant in a continued way. The Engine's Unique Force Transmission System is completely activated only by each explosion. Explosion takes place at the beginning of the $3^{rd}$ quadrant, when Pistons pass over, and thus uncover the Ignition Point exposing it to the exactly compressed air/fuel mixture. As explosion pressure acts the same on to both Pistons, pressing the Leading Piston forward and the Trailing Piston backwards, then:

On the Leading Piston Side-Disk:

Pressure exerted by the Explosion of the air/fuel mixture acts over the Rear Face of the Leading Piston, forcing it to rotationally separate from the Front Face of the Trailing Piston causing the engagement of the $1^{st}$ URTD to connect the Leading Piston to the Drive Shaft and thus transmit its Rotational Force to it. The corresponding $2^{nd}$ URTD skids due to rotational speed difference.

On the Trailing Piston Side-Disk:

Pressure exerted by the Explosion of the air/fuel mixture also acts backwards against the Front Face of the Trailing Piston forcing its backstopping $2^{nd}$ URTD to engage (and thus connect to its corresponding Carrier with its much higher Torque) not only to prevent its backward rotation but to force it to advance past the Ignition Point to start the next explosion and thus begin the following cycle. The corresponding $1^{st}$ URTD skids due to rotational speed difference.

In Brief:

Each time the Rear Face of any Piston goes past the Ignition Point a new cycle is induced. Each Explosion presses the Leading Piston forward and the Trailing Piston backwards, thus, automatically inverting the current actions of the 4 URTDs, which, due to the way in which they are arranged they become the Mechanical Brains of the Engine's Operating System, activating its Force Transmission arrangement, connecting/disconnecting accordingly in a synchronized way, not only for transmitting its Rotational Force to the Shaft but also to start a new cycle automatically.

IDENTIFICATION OF REFERENCE NUMERALS

1: Cylindrical engine-head block
2: Leading piston (pushed forward by explosion)
4': Trailing piston (pushed backwards by explosion)
6: Side-disk (carry pistons)
8: Side-disk (carry pistons)
10: Central hubs
11: Radially outward hubs
12: Drive shaft
13: Secondary output shaft with higher torque
14: First planetary gear train (reduces speed/increases torque)
16: Second planetary gear train (reduces speed/increases torque)
17: URTDs connector
18: First (inner) URTD
20: Second (outer) URTD
21': Carrier connector
22: Planets carrier
24: Sun gear
26: Planet gears
28: Ring gear fixed to housing
30: Coolant inlet
31: Cooling chamber
32: Coolant outlet
33: Curved cooling propellers (rotate with disks/draw coolant into housing)
34: Ignition and/or injection
40: Engine housing
42: Rotational internal-combustion-cycle chambers
50: Admission manifold
51: (pump hot coolant out of the housing)
52: Note: both OWCs connected to the piston
53: Fast moving
54: Slower moving
56: Fast moving
58: Slower moving
60: Fast moving
62: Disconnected (skids)
64: Connected (drives)
66: Explosion
68: High speed/direct torque
69: Slower speed/multiplied torque
70: Drives
72: Skids
74: Exhaust manifold

What we claim is:

1. A concentric rotary internal combustion engine, comprising:

a static cylindrical engine-head block, with ignition points, inlet ports, and outlet ports defining a surrounding static circular part of a set of rotational internal-combustion chambers which freely rotate about a rotatable drive shaft;

one rotating assembly set containing more than one rotational internal-combustion chambers, the assembly set comprising a first side-disk and a second side-disk, said side-disks facing each other and rotating interdependently relative to each other whereby an internal combustion cycle may be performed in between them; each side-disk having a first hub and a second hub, and for each rotational internal combustion chamber, at least two rotationally consecutive pistons, each of said pistons being fixed onto its corresponding side-disk in an alternative position, relative to the positions of pistons on the opposite facing side-disk, wherein said assembly set is substantially sealed within the static cylindrical engine-head block, and freely rotates on the drive shaft such that each rotational internal combustion chamber comprises a space contained in a varying volume chamber enclosed between faces of two consecutive pistons of said at least two pistons, including respective portion of the side-disks with their radially outward hubs, and a portion of the engine-head block between said faces;

a rotatable drive shaft extending axially through [UT] the center of said side-disks;

wherein the pistons are radially distanced from said drive shaft;

wherein the hubs cooperate with each other so that the first side-disk and the pistons fixed thereto can rotate relative to the second side-disk and the pistons fixed thereto, and vice versa, such that in operation one of said pistons will be a leading piston and one a trailing piston;

wherein the first and second side disks of the assembly set extend radially from axially opposite end portions of the hubs, respectively;

a planetary gear train at each axial end of the drive shaft, each planetary gear train comprising a central sun gear, a peripheral ring gear, and a planets carrier holding two or more planet gears for rotation in between the sun gear and the ring gear;

a set of two unidirectional rotation transmission devices (URTDs) associated with each side disk, wherein each side disk is connected to a periphery of the set of two URTDs placed back-to-back;

wherein a first URTD of said set of two URTDs is adapted to connect or disconnect with the drive shaft and therefore provides for fast moving/direct torque, and a second URTD of said set of two URTDs is adapted to connect or disconnect with the planets carrier of the planetary gear train and therefore provides a multiplied torque, not only to prevent, on explosion, the backward rotation of the trailing piston, but mainly to force its advancement past one of said ignition points to ignite a next explosion;

said inlet ports being located on surrounding cylindrical engine-head block, for admitting air and/or an air/fuel mixture into the combustion chambers;

ignition devices, and/or fuel injectors on the static cylindrical engine-head block to induce explosion in the combustion chambers; and said outlet ports being located on surrounding cylindrical engine-head block for exhausting spent gases from the combustion chambers;

wherein the consecutive pistons, the inlet and outlet ports have angular arc distance according to the following general formula:

$$p^{o} = \frac{180^{\circ} \cdot (C_R - G_R)}{(G_R + 1) \cdot (C_R - 1)}$$

where $p_n^{o}$ is a required angular arc distance between front and rear faces of each piston, or a mean angular distance in case concave piston faces are used, and the required angular arc distance of the inlet and outlet ports; n is the number of combustion chambers; 180° is a basic generating angle; $C_R$ is a desired Compression Ratio and $G_R$ is a Geared Reduction Ratio of the planetary gear train.

2. A rotary internal combustion engine according to claim 1, wherein the combustion chambers are annular or toroidal.

3. A rotary internal combustion engine according to claim 1, wherein said set of two URTDs is arranged back-to-back, wherein the two URTDs may be one way clutches or ratchets, wherein one of the two URTDs is located inwardly of the other URTD the inner URTD which is closer to its associated side-disk, being adapted to connect and disconnect with the drive shaft and therefore provides for fast moving/direct torque, and the outer URTD further from its associated side-disk and being adapted to connect or disconnect with the planets carrier of its related planetary gear train and therefore provides for slower moving and multiplied torque.

4. A rotary internal combustion engine according to claim 1, wherein a space for cooling fluid is provided at the axial sides of and/or between the side-disks.

5. A rotary internal combustion engine according to claim 4, wherein said side-disks are provided with holes to permit circulation of cooling fluid.

6. A rotary internal combustion engine according to claim 5, wherein said cooling fluid is a liquid.

7. A rotary internal combustion engine according to claim 1, wherein each of said planetary gear trains, is associated with a respective side disk and located at each axial end of the drive shaft, each one comprises:

one sun gear, located at a central part of the planetary gear train, and keyed to the drive shaft, each one next to their respective outer URTD, one ring gear, which is a peripheral inner gear fixed and keyed to the engine housing, surrounding the planetary gear train;

two or more planet gears, which rotate around the sun gear, in between the sun gear and the ring gear, and wherein the planets carrier keeps the planet gears in place, and which rotates with the planet gears at a reduced speed, relative to the sun gear, but with a multiplied torque connected to the outer URTD, to backstop a piston that, when in operation, is currently performing as a trailing piston, and advance the trailing piston past the ignition point to ignite the next explosion.

8. A rotary internal combustion engine according to claim 7, wherein the sun gear is fixed to the drive shaft and therefore moves fast with the drive shaft, and also drives the planet gears to multiply torque, thus generating backstopping torque force.

9. A rotary internal combustion engine according to claim 8 wherein ignition is effected on a spark operated ignition Otto internal combustion cycle, or on high temperature/fuel injection ignition Diesel internal combustion cycle.

10. A rotary internal combustion engine according to claim 1, further comprising additional pistons, ignition points, inlets, and outlets such that the combustion chambers are divided into more than one complete smaller combustion chamber sets, for short-stroke effect, to improve thermal efficiency and multiply torque.

11. A rotary internal combustion engine according to claim 1, wherein output derived from said planetary gear train is transferred by a shaft that is coaxial with said drive shaft.

12. A rotary internal combustion engine according to claim 1, further comprising a cooling system comprising:

two integrated cooling chambers at each axial end of the side-disks with their opened ends facing one another, and with their closed opposite ends substantially sealingly, and where appropriate, to prevent coolant leakage;

a coolant inlet and outlet, from-and-to radiator, to allow for coolant recirculation;

coolant seal;

coolant fluid;

openings on side-disks, to allow coolant flow between the cooling chambers;

optionally, inlets in side-disks to allow coolant flow inside hollowed pistons;

optionally, coolant propeller fins on side-disks, to pump coolant through the entire cooling system, even into the inside of the hollowed pistons, if available.

* * * * *